US010225577B2

United States Patent
Chen (10) Patent No.: US 10,225,577 B2
(45) Date of Patent: Mar. 5, 2019

(54) METHODS AND SYSTEMS FOR NONCAUSAL PREDICTIVE IMAGE AND VIDEO CODING

(71) Applicant: Shidong Chen, Irvine, CA (US)

(72) Inventor: Shidong Chen, Irvine, CA (US)

( * ) Notice: Subject to any disclaimer, the term of this patent is extended or adjusted under 35 U.S.C. 154(b) by 0 days.

(21) Appl. No.: 14/807,154

(22) Filed: Jul. 23, 2015

(65) Prior Publication Data
US 2016/0029043 A1 Jan. 28, 2016

Related U.S. Application Data

(60) Provisional application No. 62/028,727, filed on Jul. 24, 2014.

(51) Int. Cl.
*H04N 7/12* (2006.01)
*H04N 19/593* (2014.01)

(52) U.S. Cl.
CPC .................. *H04N 19/593* (2014.11)

(58) Field of Classification Search
CPC ................................................ H04N 19/593
See application file for complete search history.

(56) References Cited

U.S. PATENT DOCUMENTS

| | | | | | |
|---|---|---|---|---|---|
| 2,605,361 | A | * | 7/1952 | Cutler | H04N 19/593 375/247 |
| 5,689,591 | A | * | 11/1997 | Balram | H04N 19/94 382/260 |
| 2013/0272411 | A1 | * | 10/2013 | Tu | H04N 19/105 375/240.16 |

* cited by examiner

*Primary Examiner* — Young Lee
(74) *Attorney, Agent, or Firm* — MU P.C.

(57) ABSTRACT

The present invention presents fully noncausal predictive encoding and decoding methods for image, video and other signal coding. The presented noncausal predictive image coding methods largely reduce the prohibitive computational cost of the prior invention. The presented noncausal signal encoding method comprises: (1) splitting the source signal into a plurality of noncausal coding units; (2) extending each noncausal coding unit with the selected extension type; and (3) encoding each noncausal coding unit with the selected intra-unit noncausal predictor and intra-unit noncausal predictive encoding method.

25 Claims, 6 Drawing Sheets

METHODS AND SYSTEMS FOR NONCAUSAL PREDICTIVE IMAGE AND VIDEO CODING

This application refers to the prior provisional application under application No. U.S. 62/028,727 filed on Jul. 24, 2014.

BACKGROUND OF THE INVENTION

Field of Invention

The present invention relates in general to coding of image, video and other signals.

Background

It is well known that there is a large amount of redundancy in an image, video and other signal. An image or still image is a two-dimensional (2-D) spatial signal. In a digitized image signal, there is a high level of spatial correlation between the adjacent pixels. In general, the spatial correlation exists in all directions in image. For example, it exists in the horizontal direction between the current pixel and the left adjacent ones as well as between the current pixel and the right adjacent ones, in the vertical direction between the current pixel and the upper adjacent ones as well as between the current pixel and the lower adjacent ones, and in other directions too. This type of correlation is referred as the bilateral or two-sided correlation. Thus, an image signal has bilateral or two-sided spatial correlation.

A video signal is a temporally discrete image sequence, where each image in the sequence is called a video frame or frame. A video signal is three-dimensional (3-D), including 2-D spatial inside each frame and one-dimensional (1-D) temporal between frames. In a digitized video signal, there is a high level of spatial correlation between the spatially adjacent pixels inside each frame as there is in a still image, which is referred as the intra-frame correlation in video coding. As it is in still image, the intra-frame correlation is bilateral or two-sided. Additionally, there is also a high level of temporal correlation between pixels in adjacent frames, which is referred as the inter-frame correlation. In general, the inter-frame correlation exists between the pixels in current frame and ones in past frames as well as between the pixels in current frame and ones in future frames. Thus, the inter-frame correlation is bilateral or two-sided too. Therefore, a video signal has the bilateral or two-sided spatial and temporal correlation.

In an image or video transmission or storage system, in order to improve image or video quality and reduce required transmission bandwidth or storage capacity, it is desirable to remove such redundancy. The predictive coding is a common method to remove the correlation in signals. In the predictive image or video coding, a pixel prediction is generated for the current pixel from its correlated pixels. The pixels used to generate the prediction are called the reference pixels. The generated prediction is subtracted from the original pixel to produce a residual pixel. The residual pixels are uncorrelated or largely uncorrelated depending on the accuracy of the prediction. Thus, the original image or video signal is converted into a residual image or video signal. The residual signal is also called the error signal. This process is called the predictive encoding and is carried out at encoder side. Often after further digital compression, the residual image or video signal is transmitted or stored. At decoder side, the decoding processing generates the predictions and reconstructs the original pixels from the received or retrieved residual image or video signal. This process is called the predictive decoding.

Figure 1:
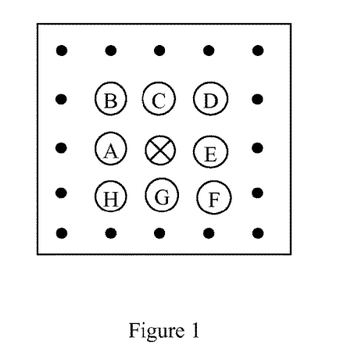
FIG. 1 illustrates some examples of the causal and noncausal image predictors.

It is normally adopted that the pixel processing takes the raster-scan order, i.e. form the top row to the bottom row in an image and from the leftmost pixel to the rightmost pixel on each row. Given such raster-scan processing order, the predictive image coding is called the spatial causal predictive coding if it generates the prediction for current pixel solely upon the reference pixels on the upper rows and on the left side of the same row. Such prediction is called the spatial causal prediction. Contrarily, the predictive image coding is called the spatial anticausal predictive coding if it generates the prediction for current pixel solely upon the reference pixels on lower rows and on the right side of the same row. Such prediction is called the spatial anticausal prediction. However, the predictive image coding is called the spatial noncausal predictive coding if it generates the prediction for current pixel upon the reference pixels on both the upper rows and the lower rows and/or on both the left side and the right side of same row. Such prediction is called the spatial noncausal prediction. Some example image predictors are shown in FIG. 1. The location of current pixel, marked by x, is $(x, y)$, where the x is the column index, a positive integer starting from 1 which is the leftmost column, and y is the row index, a positive integer starting from 1 which is the topmost row. The current pixel has four nearest adjacent pixels, named A, C, E and G with location $(x-1, y)$, $(x, y-1)$, $(x+1, y)$ and $(x, y+1)$ respectively, and four $2^{nd}$ nearest adjacent pixels, named B, D, F and H with location $(x-1, y-1)$, $(x+1, y-1)$, $(x+1, y+1)$ and $(x-1, y+1)$ respectively. The image predictor, for example, which generates the prediction for the current pixel upon any one or ones of reference pixel ABCD, which denotes pixel A, B, C and D, is causal predictor. Contrarily, the image predictor, which generates the prediction for the current pixel upon any one or ones of reference pixel EFGH, is anticausal predictor. However, the predictor, which generates the prediction for the current pixel upon AE, CG or ACEG, is noncausal predictor.

Similarly, in the predictive video coding, the predictor, which generates the prediction for the current pixel upon the adjacent reference pixels in same frame is called the intra-frame predictor or intra-predictor. The predictor, which generates the prediction for the current pixel upon the reference pixels in the past and/or the future frames, is called the inter-frame predictor or inter-predictor. Causal, anticausal and noncausal predictors are defined for intra-predictor in the same way as in the predictive image coding. Similarly, Causal, anticausal and noncausal predictors are defined for the inter-predictors if the reference frame(s) include(s) the past frame(s) only, the future frame(s) only, and both the past and future frames respectively.

It is to be noted that there is no interdependence in the causal or anticausal prediction while there is in noncausal prediction. For example in FIG. 1, the causal prediction for current pixel x depends on the reference pixel ABCD while none of the predictions of the pixel ABCD depends on current pixel x in return. Similarly, the anticausal prediction for current pixel x depends on the reference pixel EFGH while none of the predictions of the pixel EFGH depends on the current pixel in return. This allows the causal predictive encoding and decoding to be done in a single and simple forward iterative process from the first pixel to the last pixel. Similarly, it allows the anticausal predictive encoding and decoding to be done in a single and simple backward iterative process from the last pixel back to the first pixel, at some additional cost of required memory and processing delay. However, there is interdependence in noncausal prediction. For example, assume a simple noncausal image predictor, which refers to nearest adjacent reference pixel ACEG in FIG. 1. While the pixel prediction of the current pixel x depends on pixel ACEG, the predictions for its reference pixel ACEG also depend on current pixel x in return. Neither forward nor backward single iterative process can allow the predictive decoding to generate the prediction for current pixel x as the prediction will depend on the undecoded yet unknown pixels as reference. The interdependence behind the noncausal decoding creates a complicated computing problem.

Due to its straightforwardness and low computational cost, the 2-D spatial causal predictive coding is widely adopted to compress still image and the intra-frame of video. DPCM (Differential Pulse Coded Modulation) was invented as a 1-D first-order causal predictive coding [1]. It is expanded to 2-D and adopted in the lossless mode of image coding standard JPEG (JPEG-LS) to compress the still image, where the current pixel x is predicted with reference to pixel ABC as shown in FIG. 1.

In video coding standard H.264, a frame coded with intra-prediction only is called an I-frame. H.264 adopts a causal DPCM-like inter-block prediction to compress blocks in an I-frame, where already coded blocks including the ones on the left, upper left, upper and upper right, are used to predict the current block. Still refer to FIG. 1, in this case the current block is shown as x and its adjacent blocks ABCD are its reference blocks.

Figure 2:
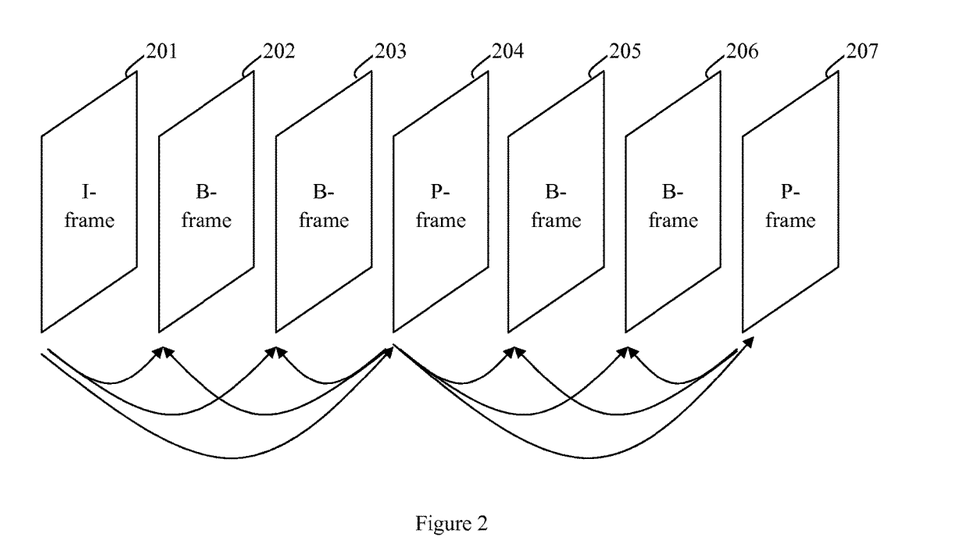
FIG. 2 illustrates an example of the inter-frame predictive coding scheme in H.264.

As image and video signals have the two-sided correlations, the two-sided noncausal predictive coding inherently generates predictions with higher accuracy, and permits higher performance and better compression than the one-sided causal coding. Efforts have been made to build the noncausal predictors. FIG. 2 shows an example of inter-frame predictive coding scheme in H.264. In H.264, a frame coded with only causal inter-frame predictions from a past frame is called a P-frame, and a frame coded with noncausal predictions from both past and future frames is called a B-frame. Although each B-frame, such as the frame 202, is coded with noncausal inter-frame predictions, and thus achieves the highest compression ratio, its reference frames, such as the frame 201 and 204, have to be either an I-frame or a P-frame without noncausal predictions. Furthermore, each P-frame, such as the frame 204, is coded with only causal predictions from a previous I-frame or P-frame, such as the I-frame 201. Thus, in general, an I-frame has the lowest compression ratio and a P-frame has a compression ratio in between. The above restriction on the inter-frame prediction is carefully chosen to avoid the interdependence of the full noncausal inter-frame prediction. It is a partially noncausal inter-frame prediction with partial benefit achieved.

The prior invention [2] discloses a layered video predictive coding scheme. The base layer adopts the conventional causal prediction and the enhancement layer adopts the noncausal prediction with reference to the already coded pixels in base layer. There is no interdependence in [2]. This is a partially noncausal prediction too as the base layer cannot be coded with noncausal prediction. Further, as the base layer usually has lower resolution or lower SNR depending on the choice of scalability, the accuracy of the noncausal prediction from the pixels in base layer is limited too.

The prior invention [3] discloses a fully noncausal predictive coding for still image. Theoretically, in [3], the two-sided noncausal residual image signal is neither generated nor transmitted. Rather, the encoder in [3] converts the two-sided noncausal residual image signal into an equivalent one-sided representative signal through the potential matrix LU decomposition and matrix inversion. Practically, both encoder and decoder in [3] have prohibitive computational cost. The potential matrix in [3] is large. For example, in the case of the simplest noncausal predictor with reference to pixel ACEG as shown in FIG. 1, the potential matrix in [3] is over 2M×2M for a 1920×1080 sized image, where 2M×2M denotes 2 million rows by 2 million columns. The invention [3] breaks the conversion into a line-by-line iterative process. In each line iteration, the image-width sized matrix decomposition and inversion are involved. For example, the matrix is 1920×1920 for a 1920×1080 sized image, larger than the original image. As those matrices cannot be transmitted to the decoder side, the decoder in [3] needs matrix decomposition and inversion again to convert the one-sided representative signal back to the original image. The decomposition and inversion of large matrix involve prohibitive computational cost.

Therefore, it is desirable to find the fully noncausal prediction and reconstruction methods with affordable computational cost for image and video coding.

SUMMARY OF THE INVENTION

The present invention presents methods and systems for the fully noncausal predictive coding with affordable computational cost of image, video and other signals. The methods and systems for the noncausal predictive coding of the present invention generate the two-sided noncausal residual image or video signal, solve the interdependence problem, and reconstruct the original image or video signal from the received or retrieved two-sided noncausal residual image or video signal.

In an embodiment of the present invention in image coding, a method and system for the noncausal predictive image coding comprise splitting the image into a plurality of image blocks, extending each block, and encoding each extended block separately with the selected intra-block noncausal predictor by methods for intra-block noncausal predictive encoding at encoder side. Further, the method and system comprise decoding each block by methods for intra-block noncausal predictive decoding at decoder side. The methods for intra-block noncausal predictive encoding include but are not limited to direct 2-D spatial encoding, 2-D matrix-vector form encoding, 2-D DFT (Discrete Fourier Transform) convolution encoding and 2-D symmetric convolution encoding. The methods for intra-block noncausal predictive decoding include but are not limited to direct 2-D spatial decoding, 2-D matrix-vector form decoding, 2-D DFT deconvolution decoding and 2-D symmetric deconvolution decoding.

In another embodiment, a method and system for the combined noncausal predictive image coding and the digital compression comprise 2-D DCT (Discrete Cosine Transform), combined noncausal predictive encoding and quantization, and entropy encoding at encoder side, and entropy decoding, combined noncausal predictive decoding and inversed quantization, and 2-D IDCT (inverse DCT) at decoder side.

In an embodiment of the present invention in video coding, a method for the noncausal predictive video coding comprises encoding the I-frames and I-blocks in P- and B-frames in conventional video coding schemes such as H.264 by the methods for the noncausal predictive image coding mentioned above of encoder side. All other blocks are coded as P-blocks or B-blocks with the conventional inter-frame predictive coding. The I-blocks in P- and B-frame includes all blocks, which adopt the intra-frame only predictive coding while the P-blocks and B-blocks adopt the inter-frame only predictive coding. Further, the method comprises decoding the I-frames and I-blocks in P- and B-frames by the methods for the noncausal predictive image coding mentioned above of decoder side. This embodiment can be used to improve the coding efficiency of existing video coding standard such as H.264.

In another embodiment of the present invention in video coding, a method and system for the noncausal predictive video coding comprise encoding each frame separately with intra-frame only noncausal predictions and without any inter-frame predictions by the methods and systems for the noncausal predictive image coding mentioned above at encoder side. Further, the method and system comprise decoding each frame separately at decoder side by the methods and systems for the noncausal predictive image coding mentioned above at decoder side. In an aspect of the embodiment, each video frame is coded separately with the intra-frame predictions only. The embodiment is referred as the method and system for the intra-frame only noncausal predictive video coding.

In yet another embodiment of the present invention in video coding, a method and system for the noncausal predictive video coding mainly comprise splitting the video sequence into video segments, finding the maximal pixel correlation path for each pixel of each frame within its video segment, extending each path, and encoding each path separately with the selected path noncausal predictor by methods for path noncausal predictive encoding at encoder side, and decoding each path by methods for path noncausal predictive decoding at decoder side. The methods for path noncausal predictive encoding include but are not limited to direct 1-D temporal encoding, 1-D matrix-vector form encoding, 1-D DFT convolution encoding and 1-D symmetric convolution encoding. The methods for path noncausal predictive decoding includes but are not limited to direct 1-D temporal decoding, 1-D matrix-vector form decoding, 1-D DFT deconvolution decoding and 1-D symmetric deconvolution decoding. In an aspect of the embodiment, each video segment is coded separately by the inter-frame only noncausal predictions and without any intra-frame predictions. The embodiment is referred as the method and system for the inter-frame only noncausal predictive coding.

In yet another embodiment of the present invention in video coding, the methods and systems for the intra-frame only and inter-frame only noncausal predictive video coding are adaptively combined into a method and system for the inter/intra adaptive noncausal predictive video coding. The method and system mainly comprise splitting the video sequence into video segments, generating intra-frame only coded residual for each pixel in each frame of each video segment by applying the method for the noncausal predictive image coding to each frame of the video segment, setting constraints and finding the maximal pixel correlation path under the constraints for each pixel within its video segment, choosing the inter-frame or intra-frame predictive coding mode for each pixel, and generating the final residual signal for each pixel based on the decision at encoder side, and decoding all inter-frame coded paths to reconstruct all inter-frame coded pixels, zeroing the intra-frame prediction for each inter-frame coded pixel in each block to build the nonlinear selective intra-block noncausal predictor, and decoding each block by the methods for intra-block noncausal predictive decoding to reconstruct all intra-frame coded pixels at decoder side.

The method and system for noncausal predictive image coding are also the embodiment of the present invention of the method and system for general noncausal predictive 2-D signal coding, and are applicable to other 2-D signals with the two-sided correlation by splitting the 2-D signal samples into 2-D blocks.

The method and system for the noncausal predictive image coding can be expanded to 3-D and are applicable to 3-D signals with the two-sided correlation, including but not limited to certain 3-D images whose pixels vary in 3-D space and video, by splitting the 3-D signal samples into 3-D blocks, such as 3-D image blocks or 3-D video blocks.

The method and system for the noncausal predictive image coding can be shrunk down to 1-D, and is applicable to the 1-D signal with the two-sided correlation, such as an audio signal, by splitting the signal samples into 1-D segments.

DETAILED DESCRIPTION OF THE INVENTION

The principle and embodiments of the present invention will now be described in detail with reference to the drawings, which are provided as illustrative examples so as to enable those skilled in the art to practice the invention. Notably, the figures and examples below are not meant to limit the scope of the present invention to a single embodiment but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration For the purpose of brevity, the original methods and systems of the present invention mentioned above will be described in detail while the derivative methods will not.

Figure 3:
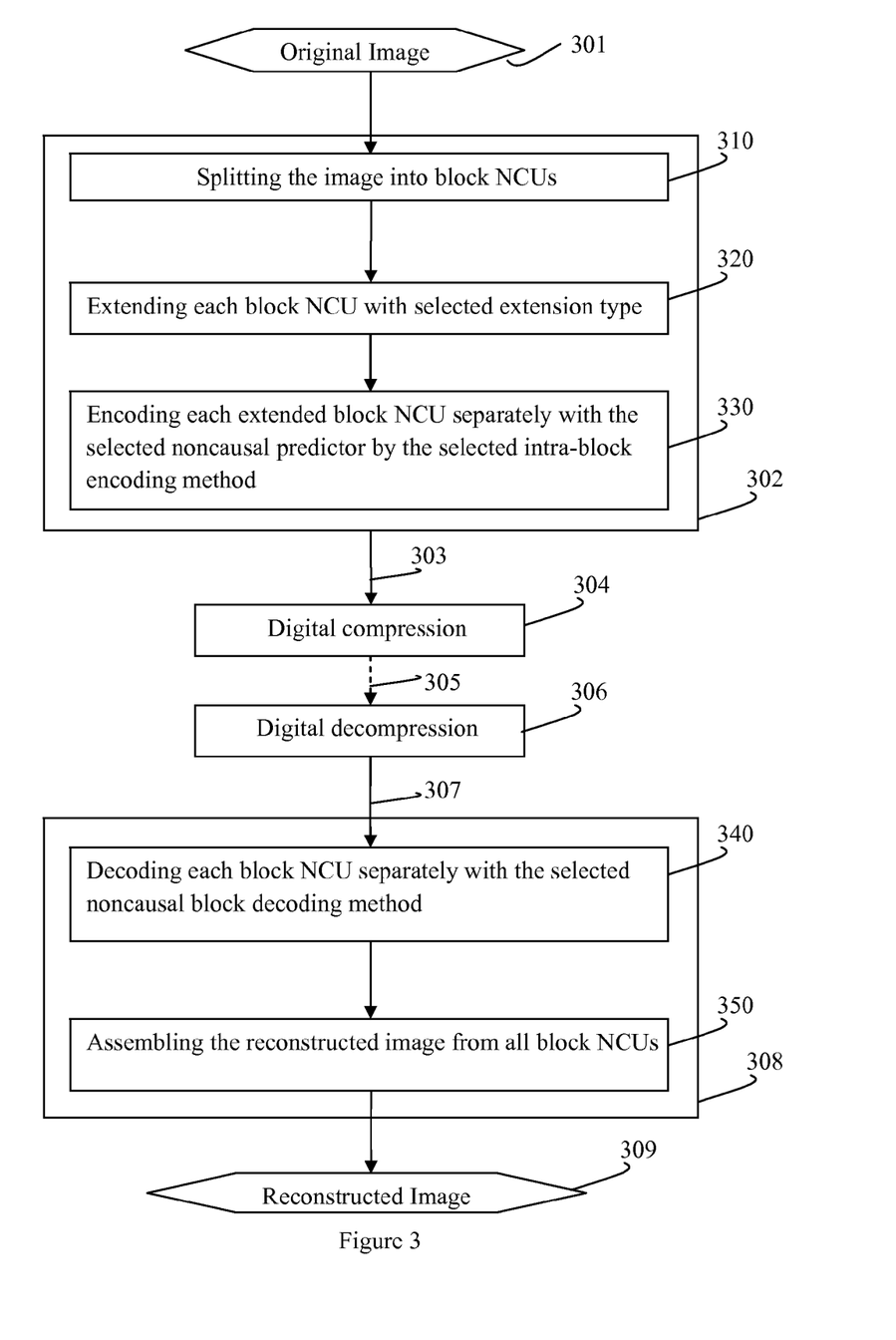
FIG. 3 illustrates an embodiment of the method and system for the noncausal predictive image coding.

In an embodiment of the present invention in image coding, the method and system for noncausal predictive image coding shown in FIG. 3 comprise following steps in the encoder 302, which converts the original image signal 301 into the two-sided residual image signal 303:

Step 1, splitting the original image 301 into a plurality of image blocks. The step is shown as 310. Each block forms a 2-D block noncausal coding unit (NCU). Each NCU is to be encoded and decoded separately. The image block is H×V sized, where H is the width in pixel and V is the height in pixel. In an embodiment, the block NCU is square-shaped, including but not limited to 4×4, 8×8, 16×16, etc. In another embodiment, the block NCU is rectangle-shaped, including but not limited to 4×8, 8×16, etc. In a special embodiment, the whole image is 1 block NCU. The block NCUs can have same size or different size.

Step 2, extending each block NCU with the extension type selected from various embodiments including but not limited to constant padding, edge padding, cyclic extension and symmetric extension. The step is shown as 320. A block NCU is limited in size, and is extended to infinity theoretically. For the purpose of brevity, the 4×4 block is assumed as example hereafter to illustrate the methods and systems unless other block size is explicitly mentioned. A 4×4 block NCU is denoted by a 4×4 matrix as follows $$\mathbb{u} = \begin{bmatrix} I_{1,1} & \cdots & I_{1,4} \\ \vdots & \ddots & \vdots \\ I_{4,1} & \cdots & I_{4,4} \end{bmatrix} \qquad \text{Eq. 1}$$

where $I_{x,y}$ is the pixel in the block at x-th column and y-th row, and x and y are integers from 1 to 4.

In an embodiment, each block NCU is extended by constant padding, where a constant value is assigned to all pixels outside the block NCU in the extended block. The constant can be 0 or any valid pixel value.

In another embodiment, each block NCU is extended by edge padding. For example the $1^{st}$ row of block un is duplicated upwards, the $4^{th}$ row downwards, $1^{st}$ column leftwards, and $4^{th}$ column rightwards. The 4 corner pixels are duplicated into 4 corner regions.

In another embodiment, each block NCU is extended by cyclic extension, where the block NCU is duplicated horizontally and vertically. The extended block NCU is a periodic image with horizontal period of H and vertical period of V.

In yet another embodiment, each block NCU is extended by symmetric extension [4]. There are 4 types of symmetric extension [4]. In one embodiment, each block NCU is extended by HS (half-sample symmetric extension) [4] horizontally and vertically. The center part of extended block is shown in following matrix $$\mathbb{u}_\infty(-3{:}8, -3{:}8) = \begin{bmatrix} I_{4,4} & \cdots & I_{4,1} & I_{4,1} & \cdots & I_{4,4} & I_{4,4} & \cdots & I_{4,1} \\ \vdots & \ddots & \vdots & \vdots & \ddots & \vdots & \vdots & \ddots & \vdots \\ I_{1,4} & \cdots & I_{1,1} & I_{1,1} & \cdots & I_{1,4} & I_{1,4} & \cdots & I_{1,1} \\ I_{1,4} & \cdots & I_{1,1} & I_{1,1} & \cdots & I_{1,4} & I_{1,4} & \cdots & I_{1,1} \\ \vdots & \ddots & \vdots & \vdots & \ddots & \vdots & \vdots & \ddots & \vdots \\ I_{4,4} & \cdots & I_{4,1} & I_{4,1} & \cdots & I_{4,4} & I_{4,4} & \cdots & I_{4,4} \\ I_{4,4} & \cdots & I_{4,1} & I_{4,1} & \cdots & I_{4,4} & I_{4,4} & \cdots & I_{4,1} \\ \vdots & \ddots & \vdots & \vdots & \ddots & \vdots & \vdots & \ddots & \vdots \\ I_{1,4} & \cdots & I_{1,1} & I_{1,1} & \cdots & I_{1,4} & I_{1,4} & \cdots & I_{1,1} \end{bmatrix} \qquad \text{Eq. 2}$$

where $\mathbb{u}_\infty(-3{:}8, -3{:}8)$ denotes the center part of the extended block with x and y in range from −3 to 8. The extended block NCU is also a periodic image with horizontal period of 2H and vertical period of 2V. This extension is required for Type-II 2-D DCT, commonly adopted in transform-based image and video coding standards such as JPEG, MPEG and H.264.

Step 3, encoding each extended block NCU separately with the selected intra-block noncausal predictor by the selected method for intra-block noncausal predictive encoding. The step is shown as 330. The selected intra-block noncausal predictor can be linear if the prediction for each pixel in the block NCU is the weighted sum of its reference pixels and the weighting factors are constant inside the block NCU. It can be nonlinear otherwise. Different block NCUs in an image may select same or different intra-block noncausal predictors. In one embodiment, each block NCU has a linear intra-block noncausal predictor that adapts to its local statistics, and different block NCUs have different adaptive yet linear intra-block noncausal predictors. As the local statistics in an image can change fundamentally from one part of image to another part, the intra-block linear yet inter-block adaptive prediction method allows the simplicity and low cost of linear prediction and high performance of nonlinear prediction in an image.

In one embodiment, methods for intra-block noncausal predictive encoding include but are not limited to the following methods:

Step 3a, direct 2-D spatial encoding. As the methods of the present invention generate the two-sided residual signal, the methods of present invention allow the pixel predictions and the residual pixels to be generated pixel by pixel directly in space domain without any conversion. Whenever the prediction needs reference pixel(s) outside the block NCU, the reference pixel(s) come(s) from the extended pixel(s) as described in step 2. The method is applicable to nonlinear predictors as well as linear predictors. In one embodiment, the ACEG noncausal predictor in symmetric form is selected. The encoding equations for each pixel are as follows $$p_{x,y} = \alpha_{x,y}(I_{x-1,y} + I_{x+1,y}) + \beta_{x,y}(I_{x,y-1} + I_{x,y+1}) \qquad \text{Eq. 3}$$

$$r_{x,y} = I_{x,y} - p_{x,y} \qquad \text{Eq. 4}$$

where the $p_{x,y}$ is the prediction for pixel (x,y), $I_{x,y}$ is its original pixel value and $r_{x,y}$ is the generated residual signal. Both x and y are integers from 1 to 4, restrained in the block NCU. If the weight factor $\alpha_{x,y}$ and $\beta_{x,y}$ are constants inside the current block NCU, the predictor is linear. If not, it is nonlinear. Eq. 3 and 4 can be combined into one as follows $$r_{x,y} = I_{x,y} - \alpha_{x,y}(I_{x-1,y} + I_{x+1,y}) - \beta_{x,y}(I_{x,y-1} + I_{x,y+1}) \qquad \text{Eq. 5}$$

When predictor in Eq. 3 is linear, Eq. 5 is indeed a linear 2-D spatial convolution as given below $$r_{x,y}=I_{x,y}-\alpha(I_{x-1,y}+I_{x+1,y})-\beta(I_{x,y-1}+I_{x,y+1}) \quad \text{Eq. 6}$$

Step 3b, 2-D matrix-vector form encoding. The method is identical to direct 2-D spatial encoding except the former computes all pixels in the block NCU in one-step while the later computes pixel by pixel. For 4×4 block NCU given in Eq.1 with Type II 2-D DCT symmetric extension, the matrix-vector form is $$\begin{bmatrix} 1-\alpha_{1,1}-\beta_{1,1} & -\alpha_{1,1} & \ldots & 0 \\ -\alpha_{1,2} & 1-\beta_{1,2} & \ldots & 0 \\ \ldots & \ldots & \ddots & \ldots \\ 0 & \ldots & -\alpha_{4,4} & 1-\alpha_{4,4}-\beta_{4,4} \end{bmatrix} \begin{bmatrix} I_{1,1} \\ I_{1,2} \\ \vdots \\ I_{4,4} \end{bmatrix} = \begin{bmatrix} r_{1,1} \\ r_{1,2} \\ \vdots \\ r_{4,4} \end{bmatrix} \quad \text{Eq. 7}$$

It is also denoted by $$A\vec{u} = \vec{r} \quad \text{Eq. 8}$$

where $\mathbb{A}$ is 16×16 matrix, $\vec{u}$ is 16×1 vector form of the image block NCU and $\vec{r}$ is the 16×1 vector form of residual image of the block NCU. As same as the method for direct 2-D spatial encoding, the method for matrix-vector form encoding in Eq. 7 or 8 is applicable to nonlinear predictors as well as linear predictors.

Step 3c, 2-D DFT convolution encoding. The method is applicable to intra-block noncausal predictive encoding if extension type is cyclic extension and the predictor is linear. The 2-D impulse function or the point-spreading function of the linear predictive coding in Eq. 6 is given by $$\mathbb{p} = \begin{bmatrix} 0 & -\beta & 0 \\ -\alpha & 1 & -\alpha \\ 0 & -\beta & 0 \end{bmatrix} \quad \text{Eq. 9}$$

where the center tap is $\mathbb{p}(0,0)$ and equals to 1. The residual block in matrix form $\mathbb{r}$ is generated by 2-D IDFT (inverse DFT) transform of element-wise multiplication of 2-D forward DFT transform of image block matrix $\mathbb{u}$ in Eq.1 by 2-D forward DFT transform of predictor's point-spreading function $\mathbb{p}$ in Eq. 9, as given by $$\mathbb{r} = \mathcal{F}_2^{-1}(\mathcal{F}_2(\mathbb{u}).*\mathcal{F}_2(\mathbb{p})) \quad \text{Eq. 10}$$

where $\mathcal{F}_2(\ )$ denotes the 2-D forward DFT transform, $\mathcal{F}_2^{-1}(\ )$ denotes the 2-D backward DFT transform, and .* denotes the element-wise multiplication of two 4×4 matrix.

Step 3d, 2-D symmetric convolution encoding. The method is applicable to the intra-block noncausal predictive encoding if extension type is symmetric extension and the predictor is linear and symmetric [4]. In the example embodiment above, given the Type-II 2-D DCT symmetric extension in Eq. 2 and the linear symmetric prediction in Eq. 9, the residual block in matrix form $\mathbb{r}$ is generated by Type-II 2-D IDCT transform of the element-wise multiplication of Type-II 2-D forward DCT transform of the image block matrix $\mathbb{u}$ in Eq. 1 by Type-I 2-D forward DCT transform of predictor's point-spreading function $\mathbb{p}$ in Eq. 9, as given by $$\mathbb{r} = C_{2e}^{-1}(C_{2e}(\mathbb{u}).*C_{1e}(\mathbb{p})) \quad \text{Eq. 11}$$

where $C_{2e}(\ )$ denotes the Type-II 2-D forward DCT transform, $C_{1e}(\ )$ denotes the Type-I 2-D forward DCT transform, $C_{2e}^{-1}(\ )$ denotes the Type-II 2-D IDCT transform, and .* denotes the element-wise multiplication of two 4×4 matrix [4].

In yet another embodiment, 2-D symmetric convolution encoding is further combined with the digital compression. It is noted that the Type-II 2-D forward DCT transform followed by quantization is commonly adopted in digital image and video compression, as given by $$\lfloor \mathcal{R} \rfloor = \lfloor C_{2e}(\mathbb{r})./Q \rfloor \quad \text{Eq. 12}$$

where $\lfloor \mathcal{R} \rfloor$ denotes quantized residual DCT coefficient matrix, $C_{2e}(\mathbb{r})$ denotes un-quantized residual DCT coefficient matrix of an image block, and $Q$ denotes the applied quantization step matrix, all in 4×4 in the example embodiment. The operator ./ denotes the element-wise division. The method for symmetric convolution encoding is combined with and is performed following the Type-II 2-D DCT transform in digital compression without either its own DCT or IDCT transform, and the element-wise multiplication is merged into the quantization matrix, as given by $$\lfloor \mathcal{R} \rfloor = \lfloor C_{2e}(\mathbb{r})./Q' \rfloor \quad \text{Eq. 13}$$

where the combined quantization matrix is given by $$Q' = Q./C_{1e}(\mathbb{p}) \quad \text{Eq. 14}$$

In one embodiment, the predictor $\mathbb{p}$ is fixed for all block NCU or is selected from a plurality of fixed patterns. Its forward DCT transform $C_{1e}(\mathbb{p})$ can be pre-computed without its DCT transform operation. The combined quantization matrix is then given by $$Q' = Q./\mathbb{p} \quad \text{Eq. 15}$$

where $\mathbb{p}$ is one of pre-computed Type-I forward DCT coefficient matrix of point-spreading function of the predictor given in Eq. 9.

Figure 9:
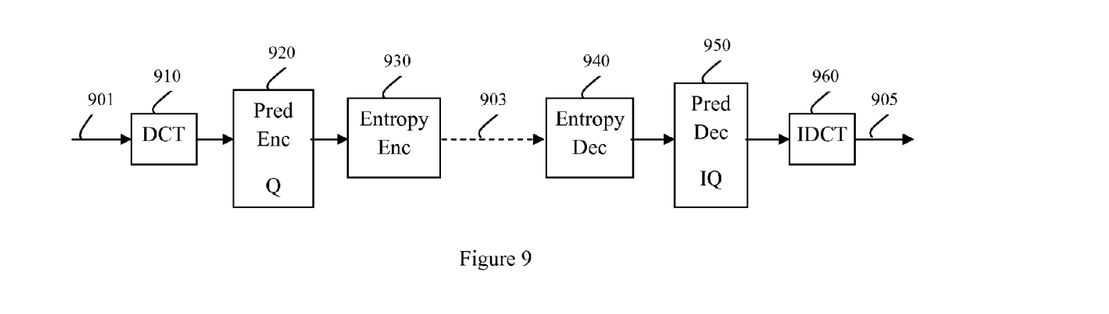
FIG. 9 illustrates an embodiment of the method and system for the combined noncausal predictive image coding and digital compression.

FIG. 9 shows an embodiment of such method and system for the combined noncausal predictive image coding and digital compression. In FIG. 9, the symmetric convolution encoding, step 3d, is merged into the quantization step 920 while the DCT transform 910 and entropy encoder 930 required by digital compression remain before and after it at encoder side. As an aspect of the embodiment, the computation cost of the method and system for the noncausal predictive image coding at the encoder side is reduced down to nearly zero. The same is true at decoder side, as detailed later.

As a variation embodiment to the method for symmetric convolution encoding, the method of 2-D DFT convolution can be adopted to encode the block too. As symmetric extension generates the periodic image signal with double sized period, for example 8×8 period for an extended 4×4 block NCU, the 8×8 DFT convolution encoding method is applicable.

After the predictive encoder 302 generates the residual image signal 303 for the block NCU, the signal 303 may further be digitally compressed. The digital compression 304 converts the residual image signal 303 into a further digitally compressed representation signal 305 typically through transform, quantization, entropy encoding, etc. The signal 305 is sent out to the transmission or storage together with metadata information for block splitting and intra-block predictors.

After it is received or retrieved, the digital decompression 306 converts the digital representation signal 305 back to the reconstructed two-sided noncausal residual image signal 307. The signal 307 is identical to 303 if the digital compression is lossless, and not if it is lossy. Accordingly, the method and system for noncausal predictive image coding shown in FIG. 3 further comprise the following steps in the decoder 308, which convert the reconstructed two-sided residual image signal 307 back to the reconstructed image 309:

Step 4, decoding each block NCU with the selected method for intra-block noncausal predictive decoding. The step is shown as 340.

In one embodiment, methods for intra-block noncausal predictive decoding include but are not limited to the following methods:

Step 4a, direct 2-D spatial decoding. The method takes two passes. The first pass is backward pixel-by-pixel iterative process, which converts the non-causal prediction to equivalent causal prediction for each pixel in the block NCU. The second pass is a normal forward pixel-by-pixel iterative process for the causal predictive decoding, which reconstructs the original pixels. This is identical to the method for 2-D matrix-vector form decoding, as detailed later.

In an embodiment of the method for direct 2-D spatial decoding where block NCU is coded by cyclic extension and linear predictor, the decoding is a 2-D spatial deconvolution, a convolution between the residual block and reconstruction filter. This is identical to method for 2-D DFT deconvolution decoding, as detailed below.

Given the linear prediction filter, the reconstruction filters include but are not limited to the inverse filter, the wiener filter, etc. For simplicity, the inverse filter is used as the example embodiment of reconstruction filter hereafter to illustrate the methods of present invention. When the predictor meets certain constraint, the inverse filter is implementable and stable. For the example, it is when weighting factors in Eq.9 meet $$|\alpha|+|\beta|<\tfrac{1}{2} \qquad \text{Eq. 16}$$

As an example embodiment, the constraint in Eq. 16 is assumed hereafter in following description.

Step 4b, 2-D matrix-vector form decoding. In one embodiment, refer to Eq. 7, first the method takes a backward row-by-row iterative process, which converts matrix $\mathbb{A}$ into a lower triangular matrix. This is identical to convert the non-causal prediction to the equivalent causal prediction. Then the method takes a forward row-by-row process to convert the lower triangular matrix into identity matrix and reconstruct all original pixels in the block NCU. This is identical to the normal forward pixel-by-pixel iterative process for causal predictive decoding.

In another embodiment of method for 2-D matrix-vector form decoding, refer to Eq. 8, decoding is performed by the inverse matrix given by $$\vec{u} = \mathbb{A}^{-1}\vec{r} \qquad \text{Eq. 17}$$

In the example of 4×4 block NCU, the inverse matrix $\mathbb{A}^{-1}$ is only 16×16. Further, in one embodiment, the predictor $\mathbb{p}$ is fixed for all block NCU or is selected from a plurality of fixed patterns. The inverse matrix $\mathbb{A}^{-1}$ can be pre-computed and the computation cost of the method in Eq. 17 is low.

Step 4c, 2-D DFT deconvolution decoding. Refer to Eq. 10, the method reconstructs the image block NCU by 2-D IDFT transform of element-wise division of 2-D forward DFT transform of residual image block matrix by 2-D forward DFT transform of predictor's point-spreading function $\mathbb{p}$ in Eq. 9, as given by $$\hat{\mathbb{u}} = \mathcal{F}_2^{-1}(\mathcal{F}_2(\mathbb{r})./\mathcal{F}_2(\mathbb{p})) \qquad \text{Eq. 18}$$

Step 4d, 2-D symmetric deconvolution decoding. Refer to Eq. 11, under the above constraints, the method reconstructs the image block NCU by Type-II 2-D IDCT transform of the element-wise division of Type-II 2-D forward DCT transform of the residual image block matrix by Type-I 2-D forward DCT transform of predictor's point-spreading function $\mathbb{p}$ in Eq. 9, as given by $$\hat{\mathbb{u}} = C_{2e}^{-1}(C_{2e}(\mathbb{r})./C_{1e}(\mathbb{p})) \qquad \text{Eq. 19}$$

Similarly, in another embodiment, 2-D symmetric deconvolution decoding is further combined IDCT based digital decompression. It is performed before the Type-II 2-D IDCT transform without either its own IDCT or DCT transform. The 2-D symmetric deconvolution decoding is merged into inverse quantization. The DCT coefficient matrix $\hat{\mathbb{U}}$ of the reconstructed block $\hat{\mathbb{u}}$ is given by $$\hat{\mathbb{U}} = \lfloor \mathbb{R} \rfloor \ast Q' \qquad \text{Eq. 20}$$

where $\lfloor \mathbb{R} \rfloor$ is the input matrix to the inverse quantizer, which is the quantized DCT coefficient matrix of residual block signal $\mathbb{r}$. The combined quantization matrix is given by $$Q' = Q./C_{1e}(\mathbb{p}) \qquad \text{Eq. 21}$$

In one embodiment, the predictor $\mathbb{p}$ is fixed for all block NCU or is selected from a plurality of fixed patterns. Its DCT transform $C_{1e}(\mathbb{p})$ can be pre-computed without its DCT transform operation. The combined quantization matrix is then given by $$Q' = Q./\mathbb{P} \qquad \text{Eq. 22}$$

Refer to FIG. 9 again. The symmetric convolution decoding is merged into the inverse quantization step 950 while the entropy decoder 940 and IDCT transform 960 required by digital decompression remain before and after it at decoder side. As an aspect of the embodiment, the computation cost of the method and system for the noncausal predictive image coding at the decoder side is reduced down to nearly zero too.

Step 5, assemble the reconstructed image 309 from all block NCUs. The step is shown as 350.

If the image is a grey-scale image, the above methods and systems for the noncausal predictive image coding applies to the grey-scale image. If the image is a color image, which has multiple components such as RGB, YUV, YMCK, the above methods and systems applies to each component image.

Theoretically, each of the above methods for the noncausal predictive image coding is lossless by itself. In a system with digital compression between the encoder 302 and decoder 308, if the compression 304 is lossless, the reconstructed image 309 is identical to the original image 301, i.e. lossless. If the compression is lossy, the reconstructed image 309 is not and it contains a filtered version of the compression error image signal. Further analysis of the error image signal is beyond the scope of the present invention.

Figure 4:
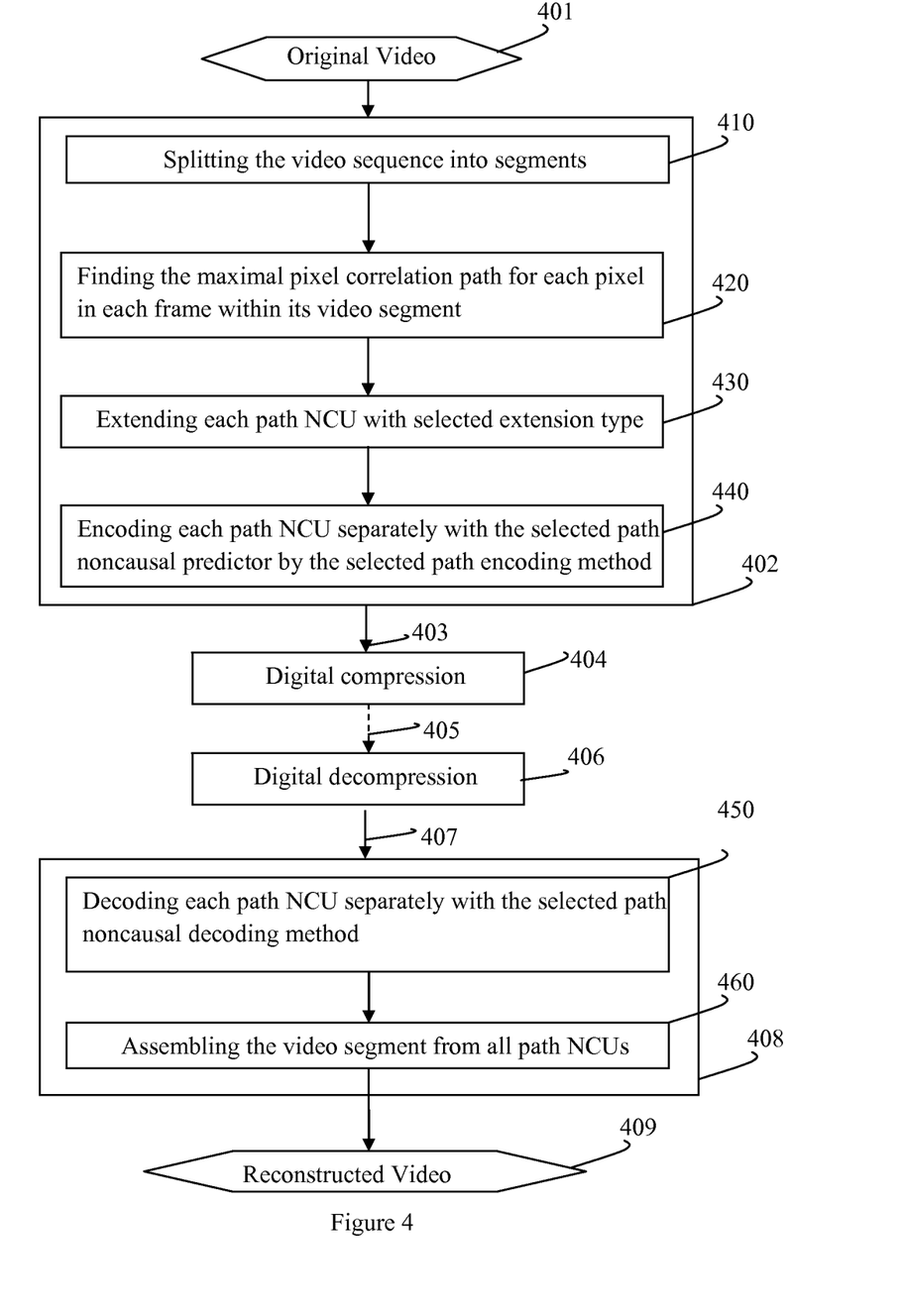
FIG. 4 illustrates an embodiment of the method and system for the inter-frame only noncausal predictive video coding.

In an embodiment of present invention in video coding, the method and system for the inter-frame only noncausal predictive video coding shown in FIG. 4 comprises the following steps in the encoder 402, which convert the original video 401 into the two-sided residual video signal 403:

Step 1, splitting the frame sequence of the source video into video segments. The step is shown as 410. Each video segment includes a plurality of consecutive frames. Each segment may have same or different number of frames. For purpose of brevity, 4 frames per segment is used hereafter in example embodiments to illustrate the methods of present invention. Each video segment is independently coded.

Figure 5:
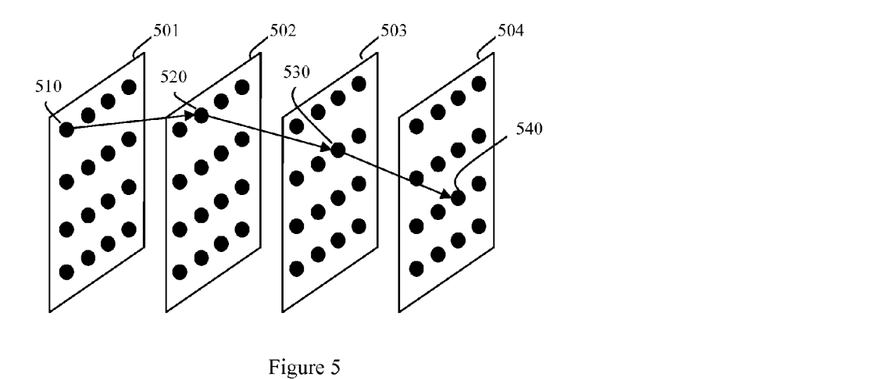
FIG. 5 illustrates an example embodiment of a maximal pixel correlation path in a video segment.

Step 2, finding the maximal pixel correlation path for each pixel in each frame within its video segment. The step is shown as 420. In the example embodiment shown in FIG. 5, the video segment includes 4 frames, labeled as 501, 502, 503 and 504 respectively. For the pixel 510 in the frame 501, search the pixels within certain range in the frame 502 (referred as motion search) and find the maximally correlated pixel 520 in the frame 502 under certain constraints. In same way, the maximally correlated pixel 530 in frame 503 is found for the pixel 520, and so on to the pixel 540 in the last frame 504 of the video segment. These found pixels, 510, 520, 530 and 540, form a maximal pixel correlation path (MPCP). Such a path is denoted by a vector $$l = [I_{x_1,y_1,1} I_{x_2,y_2,2} I_{x_3,y_3,3} I_{x_4,y_4,4}]^T \qquad \text{Eq. 23}$$

where $I_{x,y,t}$ denotes the pixel at x-th column, y-th row in t-th frame in a video segment, t is 1, 2, 3 or 4, and $[\ ]^T$ denotes the transpose. The spatial offset between the two consecutive pixels on the same path is called motion vector.

Conceptually, the MPCPs are produced by an object moving on its motion path captured by consecutive video frames. All pixels on same MPCP form a 1-D path NCU and each path NCU is to be encoded and decoded separately.

In one simple embodiment, one constraint for motion search is set to that each pixel in each frame in each video segment belongs to one MPCP exclusively and every MPCP starts from the $1^{st}$ frame and ends in the last frame. Thus, the total number of MPCPs is equal to the number of pixels in a frame. In another embodiment, the constraint is relaxed to that each pixel in each frame in each video segment belongs to one MPCP exclusively but a MPCP may end or start in an intermediate frame other than the first frame and last frame. In one embodiment, an existing MPCP ends if the correlation between the last pixel on the existing MPCP and its best-matched pixel in next frame is below a certain threshold, and a new MPCP starts. In another embodiment, the existing MPCP needs to meet certain minimal length requirement before it ends. The total number of MPCPs crossing each frame is equal to the number of pixels in the frame. However, the total number of MPCPs within a video segment is larger than or equal to the number of pixels in a frame.

There are various variations in motion search. In one embodiment, motion search is performed on a block of pixels instead of single pixel. This set a constraint that the block of pixels have same motion vector and thus it reduces the metadata information about MPCPs.

Step 3, extending each path NCU with the extension type selected from various embodiments including but not limited to constant padding, edge padding, cyclic extension and symmetric extension. The step is shown as 430. This extension step is a derived 1-D version of step 2 of the method for noncausal predictive image coding and its details are thus skipped.

Step 4, encoding each path NCU separately with the selected path noncausal predictor and encoding method. The step is shown as 440. The path noncausal predictor can be linear or nonlinear for each path NCU. Different path NCUs in a video segment may select same or different path noncausal predictor.

The methods for path noncausal predictive encoding includes but are not limited to direct 1-D temporal encoding, 1-D matrix-vector form encoding, 1-D DFT convolution encoding and 1-D symmetric convolution encoding. These encoding methods are the derived 1-D version of the methods for intra-block noncausal predictive encoding in step 3 of the method and system for noncausal predictive image coding, and its details are thus skipped. It is to be noted that it is assumed the digital compression will quantize the pixels on each residual path and entropy-encode all quantized residual pixels on each path so that the combined embodiment is still applicable.

After the predictive encoder 402 generates the two-sided noncausal residual video signal 403 for each path NCU, the residual video signal 403 may further be digitally compressed. The digital compression 404 converts the two-sided noncausal residual video signal 403 into a further digitally compressed representation signal 405 typically through transform, quantization, entropy encoding, etc. The signal 405 is sent out to the transmission or storage together with metadata information for path definition, path predictors, etc.

After the signal 405 is received or retrieved, the digital decompression 406 converts the digital representation signal 405 back to the reconstructed two-sided noncausal residual video signal 407. The signal 407 is identical to 403 if the digital compression is lossless, and it is not if it is lossy.

Accordingly, the method and system for inter-frame only noncausal predictive video coding shown in FIG. 4 further comprise the following steps in the decoder 408, which convert the reconstructed two-sided residual video 407 back to the reconstructed video 409:

Step 5, decoding each path NCU with selected method for path noncausal predictive decoding. The step is shown as 450. The methods for path noncausal predictive decoding include but are not limited to direct 1-D temporal decoding, 1-D matrix-vector form decoding, 1-D DFT deconvolution decoding and 1-D symmetric deconvolution decoding. These decoding methods are the derived 1-D version of the methods for intra-block noncausal predictive decoding in step 4 of the methods for noncausal predictive image coding, and its details are thus skipped. Similarly, it is to be noted that it is assumed the digital decompression will apply inverse quantization to the quantized DCT coefficients of residual path pixels out of the entropy decoder and apply Type-II 1-D IDCT to reconstruct the pixels on each path so that the embodiment of the combined predictive decoding and digital decompression is still applicable.

Step 6, assemble the reconstructed video segment 409 from all path NCUs. The step is shown as 460.

In the above embodiment, each video segment is coded separately by the inter-frame noncausal predictive coding and without any intra-frame prediction.

Figure 6:
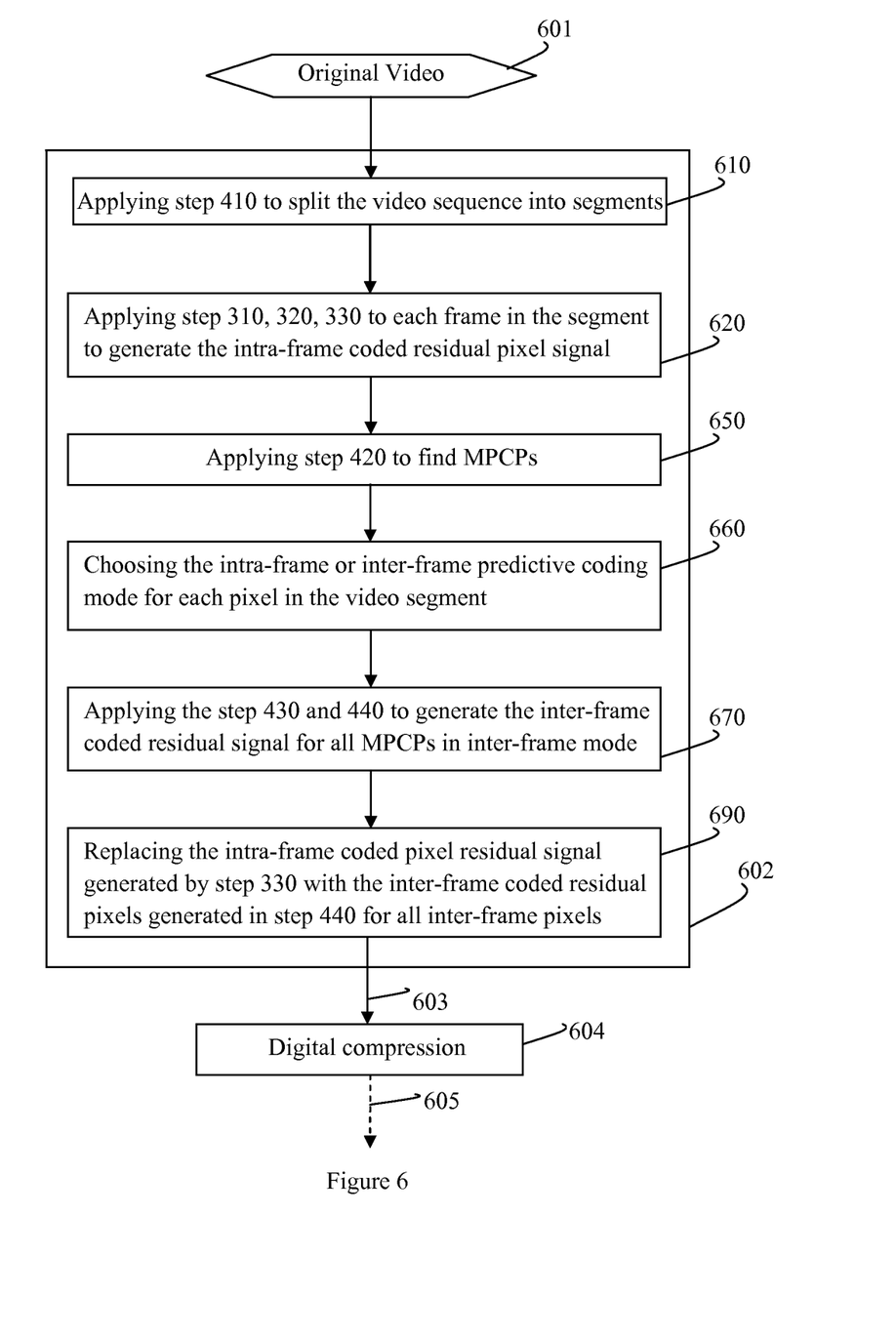
FIG. 6 illustrates an embodiment of the method and system for the inter/intra-frame adaptive noncausal predictive video coding at encoder side.
Figure 8:
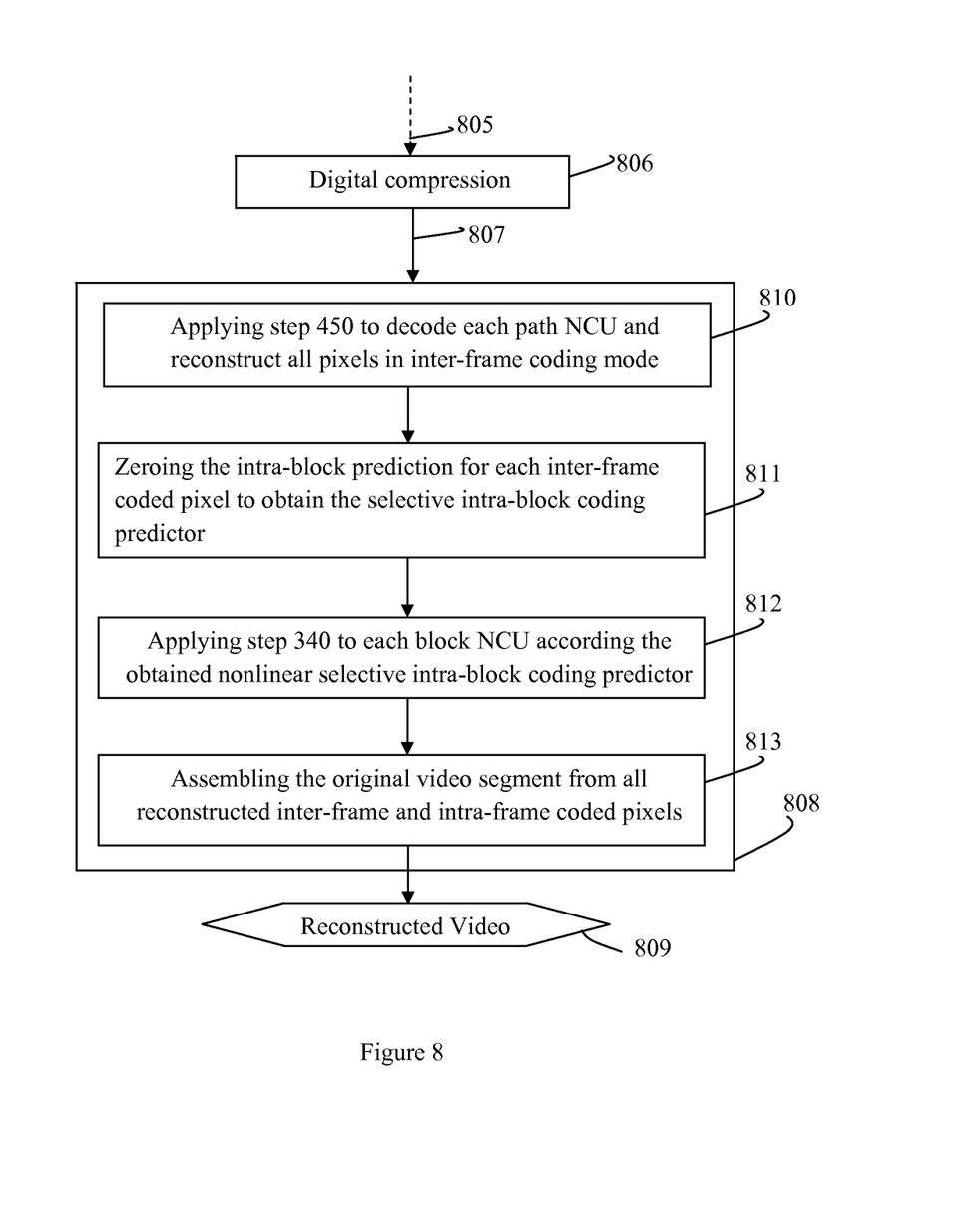
FIG. 8 illustrates an embodiment of the method and system for the inter/intra-frame adaptive noncausal predictive video coding at decoder side.

In another embodiment of the present invention in video coding, the method and system for inter/intra adaptive noncausal predictive video coding shown in FIGS. 6 and 8 comprise the following steps in the encoder 602, which convert the original video 601 into the two-sided residual video signal 603:

Step 1, applying the step 1 of the method for inter-frame only noncausal predictive video coding to split the frame sequence of the video into segments. The step is shown as 610.

Step 2 to 4, applying step 1 to 3 of the method of the noncausal predictive image coding to each frame in the video segment to generate the intra-frame coded residual signal for each pixel in each block NCU of each frame within the video segment. These steps are shown as 620.

Step 5, applying the step 2 of the method for inter-frame only noncausal predictive video coding to find each MPCP. This step is shown as 650. In one embodiment in this step, based on the intra-frame prediction generated in step 4 for each pixel, a certain threshold is set. During the motion search, an existing MPCP ends if the correlation between the last pixel on the existing MPCP and its best-matched pixel in next frame is below the certain threshold, and a new MPCP starts. There is no requirement for minimal MPCP length. The MPCP can be as short as 1 pixel long.

Step 6, choosing the intra-frame or inter-frame predictive coding mode for each pixel in the video segment. This step is shown as 660. In one embodiment, all pixels on the MPCPs with length shorter than a certain threshold are to be coded by the intra-frame predictive coding while all others are to be coded by the inter-frame predictive coding. The choice is recorded in 1-bit inter/intra flag for each pixel.

Figure 7:
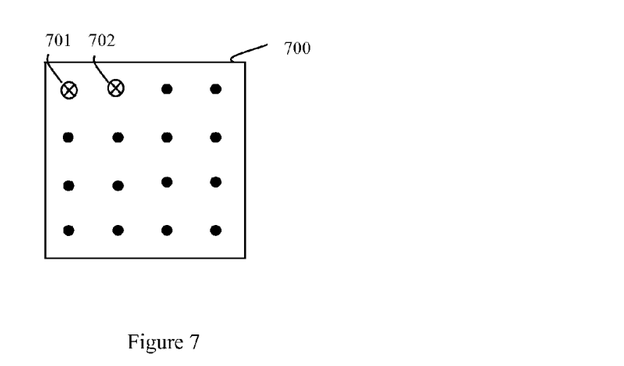
FIG. 7 illustrates an example embodiment of decisions on the inter/intra-frame predictive coding mode in a block in a frame of a video segment.

FIG. 7 shows an example of the inter/intra-frame decisions made in a 4×4 block NCU 700 in a frame of the video segment. The 2 pixels, 701 and 702 marked by x in the block NCU, are in intra-frame predictive coding mode while all other pixels are in inter-frame predictive coding mode.

In an embodiment, in order to reduce the number of bits for metadata information including inter/intra flags per video segment, the inter/intra decision is made on a plurality of pixels such a block of pixels instead of one pixel. The pixels are either all in inter-frame predictive coding mode or all in intra-frame predictive coding mode, and thus are indicated by 1-bit inter/intra flag.

Step 7 and 8, applying the step 3 and 4 of method for the inter-frame noncausal predictive video coding to generate the inter-frame coded residual signal for all MPCPs to be coded in inter-frame predictive coding mode. These steps are shown as 670.

Step 9, replacing the intra-frame coded pixel residual signal generated by step 4 with the inter-frame coded residual pixels generated in step 8 for all pixels in inter-frame predictive coding mode. This step is shown as 690. Refer to the example shown in FIG. 7, the residual pixel values generated in step 4 are kept for the intra-frame coded pixel 701 and 702. However, the residual pixel values generated in step 4 are replaced with those generated in step 8 for all other inter-frame coded pixels.

The final residual video signal 603 and the metadata information including inter/intra flag, the MPCP information, block information, etc are passed further to the digital compression 604, where it is further digitally compressed. The digital compression 604 converts the two-sided noncausal residual video signal 603 into a further digitally compressed representation signal 605 typically through transform, quantization, entropy encoding, etc. The signal 605 is sent out to the transmission or storage together with metadata information for inter/intra flog, path and path predictors, block and block predictors, etc.

After the signal 805 is received or retrieved, the digital decompression 806 in FIG. 8 converts the digital representation signal 805 back to the reconstructed two-sided noncausal residual video signal 807. The signal 807 is identical to 603 if the digital compression is lossless, and it is not if it is lossy.

Accordingly, the method and system for the inter/intra-frame adaptive noncausal predictive video coding further comprise the following steps in the decoder 808 in FIG. 8, which convert the reconstructed two-sided residual video signal 807 back to the reconstructed video 809:

Step 10, applying the step 5 of the method for inter-frame only noncausal predictive video coding to decode each path NCU and reconstruct all pixels in inter-frame coding mode. This step is shown as 810.

Step 11, zeroing the intra-block prediction in intra-block encoding Eq. 7 for each inter-frame coded pixel to obtain the selective intra-block coding predictor. This step is shown as 811. Refer to the example in FIG. 7, the intra-frame coded pixels 701 and 702 have normal noncausal prediction from their reference pixels inside the block NCU. However, the intra-block predictions of all other inter-frame coded pixels are zeroed. In other words, the inter-frame coded pixels are regarded as excluded from the intra-block noncausal predictive coding. Therefore, in general, the obtained selective intra-block coding predictor is nonlinear, and the intra-block encoding Eq. 7 is replaced by the following selective intra-block encoding equation $$\begin{bmatrix} 1-\alpha_{1,1}-\beta_{1,1} & -\alpha_{1,1} & \cdots & 0 \\ -\alpha_{1,2} & 1-\beta_{1,2} & \cdots & 0 \\ & & 1 & \\ 0 & & & \ddots \\ & & & & 1 \end{bmatrix} \begin{bmatrix} I_{1,1} \\ I_{1,2} \\ \vdots \\ I_{4,4} \end{bmatrix} = \begin{bmatrix} r_{1,1} \\ r_{1,2} \\ \vdots \\ r_{4,4} \end{bmatrix} \quad \text{Eq. 24}$$

where $r_{1,1}$ and $r_{1,2}$ are the intra-frame coded residual signal for pixel 701 and 702 while $r_{1,3}$ to $r_{4,4}$ are the inter-frame coded pixels already reconstructed in step 10. In Eq.24, the $3^{rd}$ to $16^{th}$ row of the matrix $\mathbb{A}$ are diagonalized because they describe the inter-frame coded pixels $1_{1,3}$ to $1_{4,4}$ in FIG. 7.

Step 12, applying the step 4 of the method for the noncausal predictive image coding to each block NCU of each frame within each video segment according to the nonlinear selective intra-block predictor obtained in step 11. This step, shown as 812, reconstructs the intra-frame coded pixels in each block NCU while the inter-frame coded pixels remain unchanged.

Due to the nonlinearity of the selective intra-block coding predictor, the direct spatial decoding method and matrix-vector form decoding method are applicable. In either way, in the example block NCU 700 in FIG. 7, the decoding of the adaptively coded block NCU is simplified to find values of the intra-coded pixel 701 denoted by $I_{1,1}$ and 702 demoted by $I_{1,2}$ as all other pixels are regarded as unchanged or already known. The selective intra-block encoding equation Eq. 24 is thus simplified into $$\begin{bmatrix} 1-\alpha_{1,1}-\beta_{1,1} & -\alpha_{1,1} \\ -\alpha_{1,2} & 1-\beta_{1,2} \end{bmatrix} \begin{bmatrix} I_{1,1} \\ I_{1,2} \end{bmatrix} = \begin{bmatrix} \beta_{1,1}I_{2,1}+r_{1,1} \\ \alpha_{1,2}I_{1,3}+\beta_{1,2}I_{2,2}+r_{1,2} \end{bmatrix} \quad \text{Eq. 25}$$

Eq. 25 is solved to reconstruct the intra-coded pixel 701 denoted by $I_{1,1}$ and 702 demoted by $I_{1,2}$.

Step 13, assembling the original video segment from all reconstructed inter-frame and intra-frame coded pixels.

The present invention is described according to the accompanying drawings and examples. It is to be understood that the present invention is not limited to such embodiments. In the variations of the methods and systems of the present invention, the order of some steps can be changed, some steps can be combined together, some can be spitted, and some can be modified. Modifications and variations could be effected by those skilled in the art without departing from the spirit or scope of the invention as defined in the appended claims.

REFERENCE

[1] U.S. Pat. No. 2,605,361, DIFFERENTIAL QUANTIZATION of COMMUNICATION SIGNALS
[2] U.S. Patent 2013/0272411 A1, SCALABLE VIDEO CODING PREDICTION WITH NON-CAUSAL INFORMATION
[3] U.S. Pat. No. 5,689,591, APPARATUS AND METHOD FOR NONCAUSAL, PREDICTIVE, DIGITAL IMAGE COMPRESSION
[4] IEEE TRANSACTIONS ON SIGNAL PROCESSING, Symmetric Convolution and the Discrete Sine and Cosine Transforms, Vol. 42, NO. 5

I claim:

1. An encoding method of noncausal predictive signal coding, comprising:
   (1) splitting the source signal into a plurality of noncausal coding units;
   (2) extending each noncausal coding unit with the selected extension type;
   (3) encoding each noncausal coding unit with the selected intra-unit noncausal predictor and intra-unit noncausal predictive encoding method; and
   wherein the signal includes but is not limited to a 2-dimensional signal and a 3-dimensional signal, a 2-dimensional signal including but not limited to an image, and a 3-dimensional signal including but not limited to a 3-dimensional image and a video wherein the noncausal coding units includes but is not limited to 1-dimensional units, 2-dimensional units and 3-dimensional units, the 1-dimensional unit including but not limited to a maximal pixel correlation path, the 2-dimensional unit including but not limited to an image block, and the 3-dimensional unit including but not limited to a 3-dimensional image block or a 3-dimensional pixel block of video, wherein the source signal is divided into a plurality of noncausal coding units of same size or different size; wherein the extension type includes but is not limited to constant padding, edge padding, cyclic extension and symmetric extension; wherein the intra-unit noncausal predictor is linear or nonlinear; and wherein different noncausal coding units adopt same intra-unit noncausal predictor or different intra-unit noncausal predictors, wherein the signal is a 2-dimensional image, each noncausal coding unit is a 2-dimensional image blocks, the extension type is a 2-dimensional extension type, each intra-unit noncausal predictor is a 2-dimensional intra-block noncausal predictor; the intra-unit noncausal predictive encoding method is a 2-dimensional intra-block noncausal predictive encoding method;. the extension type is the symmetric extension and the intra-block noncausal predictor is linear and symmetric, the 2-dimensional intra-block noncausal predictive encoding method is 2-dimensional symmetric convolution encoding; digital compression of the image blocks encoded by the intra-block noncausal predictive encoding method and when the intra-block noncausal predictive encoding method is used, the 2-dimensioanl symmetric convolution encoding is combined with the digital compression, and the combined encoding equation is given by $$\lfloor \mathcal{R} \rfloor = \lfloor C_{2e}(\mathbb{I})./Q' \rfloor,$$

where $\lfloor \mathcal{R} \rfloor$ denotes the quantized residual DCT coefficient matrix of a residual image block generated by the intra-block noncausal predictive encoding method, $C_{2e}(\mathbb{I})$ denotes the un-quantized residual DCT coefficient matrix of the residual image block generated by the intra-block noncausal predictive encoding method, and Q' denotes the combined quantization step matrix given by $$Q' = Q./C_{1e}(\mathbb{P})$$

where Q denotes the quantization step matrix of digital compression without combination, and $C_{1e}(\mathbb{p})$ denotes the Type-I 2-dimensional forward DCT transform of the point-spreading function of the intra-block noncausal predictor.

2. The encoding method of claim 1, wherein the 2-dimensional intra-block noncausal predictive encoding method includes direct 2-dimensional spatial encoding, 2-dimensional matrix-vector form encoding, 2-dimensional DFT convolution encoding and 2-dimensional symmetric convolution encoding.

3. The encoding method of claim 1, wherein when the extension type is the cyclic extension and the intra-block noncausal predictor is linear, the 2-dimensional intra-block noncausal predictive encoding method is 2-dimensional DFT convolution encoding.

4. The encoding method of claim 1, wherein each image block adopts the same intra-block noncausal predictor or selects one intra-block noncausal predictor from a plurality of pre-defined intra-block noncausal predictors, each combined quantization step matrix is pre-defined by $Q'=Q./\mathbb{p}$, where $\mathbb{p}$ is the Type-I forward DCT coefficient matrix of the point-spreading function of the pre-defined intra-block noncausal predictor or a pre-defined intra-block noncausal predictor.

5. An encoding method of claim 1, wherein the signal is a 3-dimensional video; wherein the noncausal coding units includes both 2-dimensional image blocks and 1-dimensional maximal pixel correlation paths; wherein the extension type is a 2-dimensional extension type when the noncausal coding unit is a 2-dimensional image block, and is a 1-dimensional extension type when the noncausal coding unit is a 1-dimensional maximal pixel correlation path; wherein the intra-unit noncausal predictor is a 2-dimensional intra-block noncausal predictor when the noncausal coding unit is a 2-dimensional image block, and is a 1-dimensional path noncausal predictor when the noncausal coding unit is a 1-dimensional maximal pixel correlation path; wherein the intra-unit noncausal predictive encoding method is the 2-dimensional intra-block noncausal predictive encoding method when the noncausal coding unit is a 2-dimensional image block, and is the 1-dimensional path noncausal predictive encoding method when the noncausal coding unit is a 1-dimensional maximal pixel correlation path; and wherein the step (1), splitting the source signal into a plurality of noncausal coding units, comprising: (a) splitting the frame sequence of the video into video segments, each video segment including a plurality of temporally consecutive video frames; (b) splitting each video frame of the video segment into image blocks; and (c) finding the maximal pixel correlation path for each pixel of each frame within its video segment; wherein the encoding method further comprising: (d) choosing the intra-frame or inter-frame predictive coding mode for each pixel in the video segment; wherein the step (2), extending each noncausal coding unit with the selected extension type, comprising: (e) extending each maximal pixel correlation path with the selected 1-dimensional extension type, and extending each image block with the selected 2-dimensional extension type; and wherein the step (3), encoding each noncausal coding unit with the selected intra-unit noncausal predictor and intra-unit noncausal predictive encoding method, comprising: (f) encoding each image block with the selected intra-block noncausal predictor and intra-block noncausal predictive encoding method to generate the intra-frame coded residual pixel value for each pixel; (g) encoding each maximal pixel correlation path which includes only the pixels in the inter-frame predictive coding mode with the selected path noncausal predictor and path noncausal predictive encoding method to generate the inter-frame coded residual pixel value only for each pixel in the inter-frame predictive coding mode; and (h) keeping the residual pixel value generated in step (f) for each pixel in the intra-frame predictive coding mode while replacing the residual pixel value generated in step (f) with the residual pixel value generated in step (g) for each pixel in the inter-frame predictive coding mode.

6. The encoding method of claim 5, wherein the 2-dimensional intra-block noncausal predictive encoding method includes direct 2-dimensional spatial encoding and 2-dimensional matrix-vector form encoding; and wherein the 1-dimensional path noncausal predictive encoding method includes direct 1-dimensional temporal encoding and 1-dimensional matrix-vector form encoding.

7. The encoding method of claim 5, wherein when the extension type is cyclic extension, and the intra-block noncausal predictor is linear, the 2-dimensional intra-block noncausal predictive encoding method is 2-dimensional DFT convolution encoding; and wherein when the extension type is cyclic extension, and the path noncausal predictor is linear, the 1-dimensional path noncausal predictive encoding method is 1-dimensional DFT convolution encoding.

8. The encoding method of claim 5, wherein when the extension type is symmetric extension, and intra-block noncausal predictor is linear and symmetric, the 2-dimensional intra-block noncausal predictive encoding method is 2-dimensional symmetric convolution encoding; and wherein when the extension type is symmetric extension, and path noncausal predictor is linear and symmetric, the 1-dimensional path noncausal predictive encoding method is 1-dimensional symmetric convolution encoding.

9. The encoding method of claim 5, wherein the maximal pixel correlation path is defined as a 1-dimensional pixel series of length N found by: starting with a pixel 1 in a certain first frame of a video segment, searching the pixels within certain range in the second following frame and finding the pixel 2 under certain constraints, which has maximal correlation with the pixel 1, and so on to the pixel N in a certain last frame of the video segment, which has maximal correlation with the pixel N−1 in its previous video frame, where the certain first frame is the first frame of the video segment or a later frame after it, the certain last frame is the last frame of the video segment or an earlier frame before it, and N is a positive number less than or equal to the number of video frames in the video segment.

10. A decoding method for the encoding method of claim 1, comprising: (1) decoding each noncausal coding unit with the selected intra-unit noncausal predictive decoding method; and (2) assembling the reconstructed signal from all decoded noncausal coding units.

11. A decoding method of claim 10, wherein the signal is a 2-dimensional image; wherein each noncausal coding unit is a 2-dimensional image block; and wherein the intra-unit noncausal predictive decoding method is the 2-dimensional intra-block noncausal predictive encoding method.

12. The decoding method of claim 11, wherein the 2-dimensional intra-block noncausal predictive decoding method includes direct 2-dimensional spatial decoding, 2-dimensional matrix-vector form decoding, 2-dimensional DFT deconvolution decoding and 2-dimensional symmetric deconvolution decoding.

13. The decoding method of claim 11, wherein digital decompression is applied before the decoding method.

14. A decoding method of claim 10, wherein the signal is a 3-dimensional video; wherein each noncausal coding unit is a 1-dimensional maximal pixel correlation path; wherein the intra-unit noncausal predictive decoding method is the 1-dimensional path noncausal predictive decoding method; and wherein the step (2), assembling the reconstructed signal from all decoded noncausal coding units, comprising: (a) assembling each reconstructed video segment from the decoded maximal pixel correlation paths; and (b) assembling the reconstructed video from the reconstructed video segments.

15. The decoding method of claim 14, wherein the 1-dimensional path noncausal predictive decoding method includes direct 1-dimensional temporal decoding, 1-dimensional matrix-vector form decoding, 1-dimensional DFT deconvolution decoding and 1-dimensional symmetric deconvolution decoding.

16. The decoding method of claim 15, wherein digital decompression is applied before the decoding method.

17. A decoding method of claim 10, wherein the signal is a 3-dimensional video; wherein the noncausal coding units includes both 2-dimensional image blocks and 1-dimensional maximal pixel correlation paths encoded by the path noncausal predictive encoding method; wherein the intra-unit noncausal predictive decoding method is the 2-dimensional intra-block noncausal predictive decoding method for the nonlinear selective intra-block coding predictor when the noncausal coding unit is a 2-dimensional image block, and is 1-dimensional path noncausal predictive decoding method when the noncausal coding unit is a 1-dimensional maximal pixel correlation path; wherein the step (1), decoding each noncausal coding unit with the selected intra-unit noncausal predictive decoding method, comprising: (a) decoding each maximal pixel correlation path with the selected path noncausal predictive decoding method, which is encoded by the path noncausal predictive encoding method; (b) building the nonlinear selective intra-block coding predictor for each image block by zeroing all predictions from any pixels inside the image block to each pixel that is inside the image block and has been decoded in step (a); and (c) decoding each image block with the selected intra-block noncausal predictive decoding method for the nonlinear selective intra-block coding predictor; and wherein the step (2), assembling the reconstructed signal from all decoded noncausal coding units, comprising: (d) assembling each video segment from the pixels decoded in step (a) and (c); and (e) assembling the reconstructed video from the reconstructed video segments.

18. An encoding method of claim 1, wherein the signal is a 3-dimensional video; wherein each noncausal coding unit is a 1-dimensional maximal pixel correlation path; wherein the extension type is the 1-dimensional extension type; wherein each intra-unit noncausal predictor is a 1-dimensional path noncausal predictor; wherein the intra-unit noncausal predictive encoding method is the 1-dimensional path noncausal predictive encoding method; and wherein the step (1), splitting the source signal into a plurality of noncausal coding units, comprising: (a) splitting the frame sequence of the video into video segments, each video segment includes a plurality of temporally consecutive video frames; and (b) finding the maximal pixel correlation path for each pixel of each frame within its video segment.

19. The encoding method of claim 18, wherein each video segment includes same or different number of video frames.

20. The encoding method of claim 18, wherein the maximal pixel correlation path is defined as a 1-dimensional pixel series of length N found by: starting with a pixel 1 in a certain first frame of a video segment, searching the pixels within certain range in the second following frame and finding the pixel 2 under certain constraints, which has maximal correlation with the pixel 1, and so on to the pixel N in a certain last frame of the video segment, which has maximal correlation with the pixel N−1 in its previous video frame, where the certain first frame is the first frame of the video segment or a later frame after it, the certain last frame is the last frame of the video segment or an earlier frame before it, and N is a positive number less than or equal to the number of video frames in the video segment.

21. The encoding method of claim 18, wherein the 1-dimensional path noncausal predictive encoding method includes direct 1-dimensional temporal encoding, and 1-dimensional matrix-vector form encoding.

22. The encoding method of claim 18, wherein when the extension type is cyclic extension and path noncausal predictor is linear, the 1-dimensional path noncausal predictive encoding method is 1-dimensional DFT convolution encoding.

23. The encoding method of claim 18, wherein when the extension type is symmetric extension and path noncausal predictor is linear and symmetric, the 1-dimensional path noncausal predictive encoding method is 1-dimensional symmetric convolution encoding.

24. The encoding method of claim 23, further comprising: (4) digital compression of the paths encoded by the path noncausal predictive encoding method.

25. The encoding method of claim 24, wherein the 1-dimensional symmetric convolution encoding is combined with the digital compression.

* * * * *